(12) United States Patent
Ilyasov et al.

(10) Patent No.: US 7,711,874 B1
(45) Date of Patent: May 4, 2010

(54) USAGE OF EHCI COMPANION USB CONTROLLERS FOR GENERATING PERIODIC EVENTS

(75) Inventors: Oleg Ilyasov, Lilburn, GA (US); Sivagar Natarajan, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 433 days.

(21) Appl. No.: 11/087,458

(22) Filed: Mar. 23, 2005

(51) Int. Cl.
*G06F 3/00* (2006.01)
*G06F 5/00* (2006.01)
*G06F 13/12* (2006.01)
*G06F 13/38* (2006.01)
*G06F 15/173* (2006.01)
*G06F 7/04* (2006.01)
*G06F 17/30* (2006.01)
*G06F 11/00* (2006.01)
*H04N 7/16* (2006.01)

(52) U.S. Cl. ............... 710/52; 710/1; 710/6; 710/67; 709/240; 709/241; 726/26; 714/25

(58) Field of Classification Search ............ 710/1, 710/6, 67, 52; 714/25; 726/26; 709/240, 709/241
See application file for complete search history.

(56) References Cited

U.S. PATENT DOCUMENTS

| | | | | |
|---|---|---|---|---|
| 4,896,290 A | * | 1/1990 | Rhodes et al. ............... 710/67 |
| 5,714,983 A | * | 2/1998 | Sacks ......................... 345/168 |
| 5,748,888 A | * | 5/1998 | Angelo et al. ................ 726/26 |
| 6,101,550 A | * | 8/2000 | Zucker ........................ 709/241 |
| 6,119,194 A | * | 9/2000 | Miranda et al. ............. 710/306 |
| 6,829,726 B1 | * | 12/2004 | Korhonen .................... 714/25 |
| 6,938,103 B2 | * | 8/2005 | Azzarito et al. ................ 710/6 |
| 2003/0005182 A1 | * | 1/2003 | Leete et al. .................... 710/1 |
| 2003/0177297 A1 | * | 9/2003 | Hesse et al. ................. 710/305 |

* cited by examiner

*Primary Examiner*—Henry W. H. Tsai
*Assistant Examiner*—Kris Rhu
(74) *Attorney, Agent, or Firm*—Hope Baldauff Hartman

(57) ABSTRACT

A polling system polls a USB keyboard connected to a USB port of a computing system. A detect module in identifies the keyboard as a low speed USB device. A polling module polls the keyboard with the scheduled interrupt transactions. A key press polling response module detects a key press, stores corresponding key scan data in a key data buffer, and returns the key scan data in response to a scheduled interrupt transaction from the polling module. A key repeat polling response module starts a key repeat polling mode when the key scan data is returned from the key press polling response module, detects whether the key data buffer is empty when a scheduled interrupt transaction is received, and returns the key scan data again if the key scan data buffer is not empty. A stop module stops the key repeat polling mode if the key scan data buffer is empty.

9 Claims, 5 Drawing Sheets

USAGE OF EHCI COMPANION USB CONTROLLERS FOR GENERATING PERIODIC EVENTS

FIELD OF THE INVENTION

This invention relates to a USB 2.0 enhanced host control interface (EHCI) using a classic USB control interface to create a periodic event for a USB 1.1 device connected to the computing system.

BACKGROUND OF THE INVENTION

An example of a periodic event in a slow USB 1.1 type device is the polling of a keyboard for key repeat data. In a key repeat event a key is pressed and held on the keyboard. The key scan data will be resent to the keyboard controller driver every 8 milliseconds so long as the key is not released. As a result the computer will display or otherwise enter the same key repetitively every 8 milliseconds until the key press is released. In USB 1.1 devices, this is accomplished by polling the keyboard driver every 8 milliseconds and returning key scan data for each polling operation. These repetitive polling operations were scheduled and performed by a universal host control interface (UHCI) or an open host control interface (OHCI) as defined for USB 1.1. These interfaces are known as the classic interfaces for USB.

A problem has arisen in that the enhanced host control interface (EHCI) for USB 2.0 does not provide a mechanism for generating generic periodic events internally. It is possible to generate periodic events based on USB 1.1 devices, but this event will not be generic and needs a lot of computer resources. It is always possible to use clocking available at the computer, but this clocking is not necessarily reliable. It is preferable to use internal operations in the computer that are performed in a known time interval. For example the accessing of a non-existent USB device using transfer structures created in memory from the host control driver by a universal host control interface or an open host control interface driver can be used to provide a periodic timed event.

When a slow USB type device such as a keyboard driver is attached to a high speed USB 2.0 port, this USB 2.0 port is controlled through the enhanced host control interface. Therefore, there is no mechanism in the host control driver using only EHCI to internally generate a periodic timing event.

It is with respect to this problem and others that the present invention has been created.

SUMMARY OF THE INVENTION

In accordance with this invention the above and other problems have been solved by providing a companion classic host control driver, i.e., universal host control interface driver or open host control interface driver, added to the firmware in addition to the enhanced host control interface driver. This companion classic driver is added to the firmware in addition to the enhanced host control interface driver to support low/full speed USB devices. The classic host control interface driver can then be used to poll a keyboard driver for a key press, and in response to key data from a key press utilize a hardware mechanism such as sending USB transactions to a non-existent device address to create periodic events to poll the keyboard driver with scheduled interrupt transactions looking for key repeat events.

In one aspect of the invention a method for periodically polling a USB device driver for a USB device connected to a USB port of a computing system begins by identifying the type of USB device connected to the USB port. The USB device driver is polled for data from the USB device with interrupt transactions. A first response from the USB device driver is returned. The first response includes data from the USB device. The USB device driver is then set into a repeat mode. If the USB device driver is in the repeat mode, a response to key repeat interrupt transactions is to return a response the same as the first response.

In another aspect of the invention, a polling system in a computing system polls a USB keyboard connected to a USB port of the computing system. The polling system has a host control driver and a keyboard driver. The host control driver has a detect module, a setup module, and a polling module. The keyboard driver has a key press polling response module, and a key repeat polling response module. The detect module in the host control driver identifies the keyboard connected to the USB port and finds the keyboard is a low speed USB device. The setup module sets up scheduled interrupt transactions to poll the keyboard driver. The polling module polls the keyboard driver with the scheduled interrupt transactions. The key press polling response module detects a key press, stores key scan data corresponding to the key press in a key data buffer, and sends the key scan data to the host control driver in response to a scheduled interrupt transaction from the polling module. The key repeat polling response module starts a key repeat polling mode when the host control driver processes the key scan data from the key press polling response module, detects during the key repeat polling mode whether the key data buffer is empty when a scheduled interrupt transaction is received, and sends the key scan data again to the host control driver if the key scan data buffer is not empty. A stop module stops the key repeat polling mode if the key scan data buffer is empty.

The invention may be implemented as a computer process, a computing system or as an article of manufacture such as a computer program product or a computer readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF PREFERRED EMBODIMENTS

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts or modules may be implemented in software, in firmware, in special purpose digital logic, or in any combination thereof without deviating from the spirit and scope of the present invention as recited within the claims attached hereto.

Figure 1:
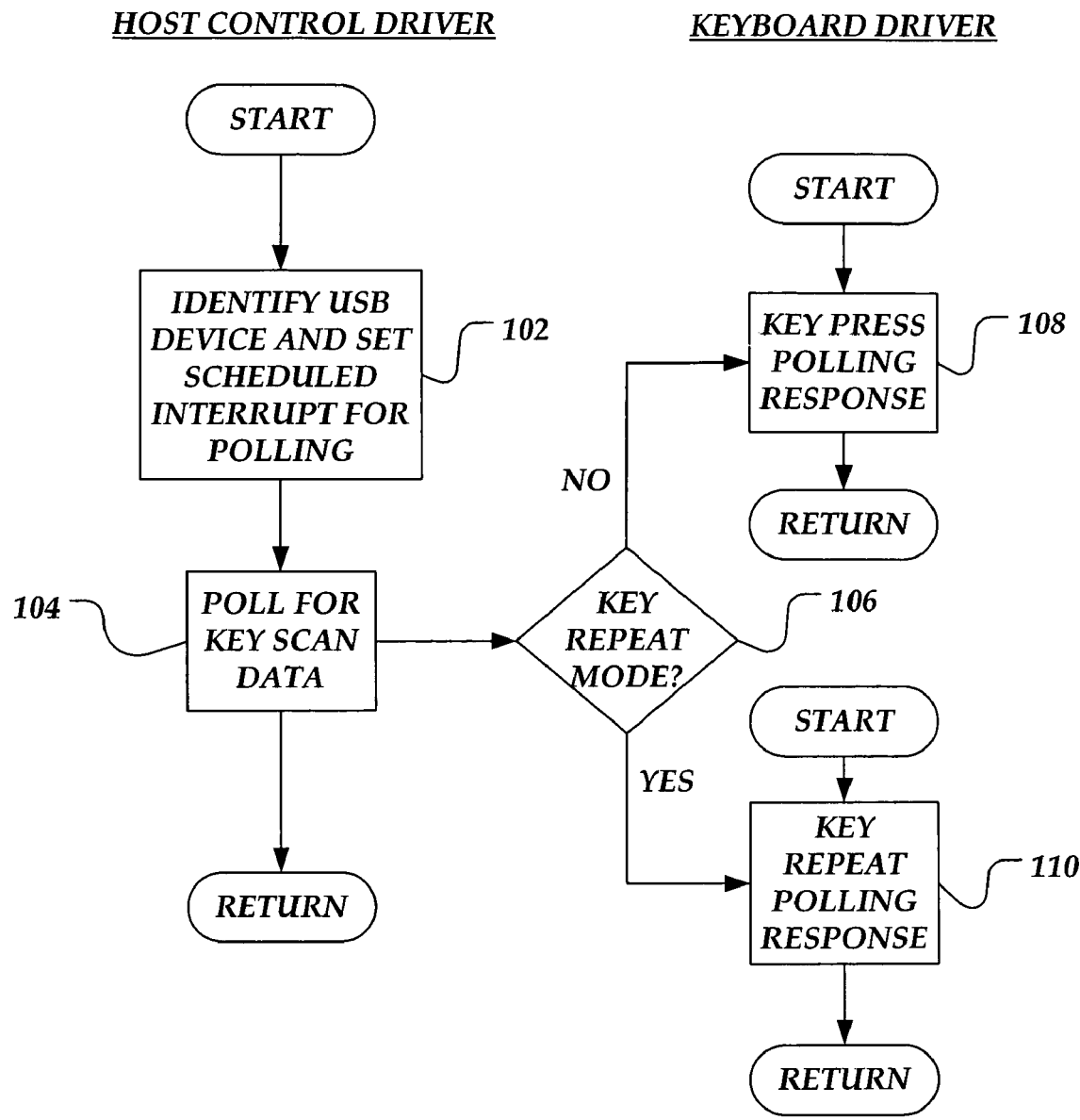
FIG. 1 shows the operational flow of a preferred embodiment of the invention where the host control driver polls a keyboard driver looking either for a key press polling response or a key repeat polling response.

In the preferred embodiment in FIG. 1, the operational flow of the interaction between the host control driver and a USB device driver, represented by a keyboard driver, is shown. Drivers, as used herein, generally refer to software that controls or handles the device referred to in the name of the driver. For example, a host control driver controls or handles a host controller device. Likewise, a keyboard driver would control or handle a keyboard device. The host control driver and keyboard driver are preferably implemented as firmware in the computer that is residing in the BIOS chip, the EHCI chip or other firmware chips on the motherboard of the computer. The host control driver includes an identify USB device module 102. This identify module 102 will poll the port to which the USB device is attached. Based on the type of USB device identified, i.e., USB 1.1 or USB 2.0, the device speed is found, and the identify module 102 will set a scheduled interrupt for polling the USB device. If the USB device is a keyboard which is a USB 1.1 type device then the scheduled interrupt for polling will be set using the classic UHCI or OHCI firmware that is a companion to the EHCI firmware.

Once the device is identified and an appropriate schedule for interrupt polling has been set, the polling module 104 will begin to poll the USB device driver. As illustrated in FIG. 1 the USB device is a keyboard, and the polling module 104 will poll the keyboard device for key scan data.

Key repeat mode test operation 106 will detect whether the keyboard driver is in a key repeat mode. If the keyboard driver is not in a key repeat mode then the polling interrupt is passed to the key press polling response module 108. Key press as used in this description of the invention refers to either the pressing of a key or the releasing of a key; either represents a key change that will result in a change in key scan data.

If the key repeat mode test operation 106 detects that the keyboard driver is in a key repeat mode, then the operational flow will pass to the key repeat response module 110 which will respond to the poll from the polling module 104. The keyboard driver will stay in the key repeat mode until there is no key scan data to be returned to the host control driver.

Figure 2:
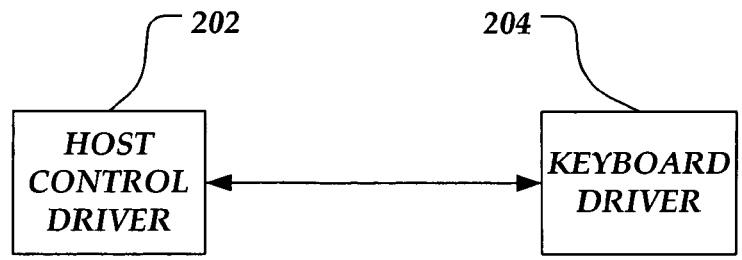
FIG. 2 illustrates that the environment of the invention is in the conversation between a host control driver module and a device driver module such as a keyboard driver module.

FIG. 2 illustrates that the modules performing the operations of the invention are the host control driver 202 and the keyboard driver 204. Of course if the USB device is something other than a keyboard driver that requires periodic timing events, then the device driver 204 would be the appropriate driver for the slow USB 1.1 type of device.

Figure 3:
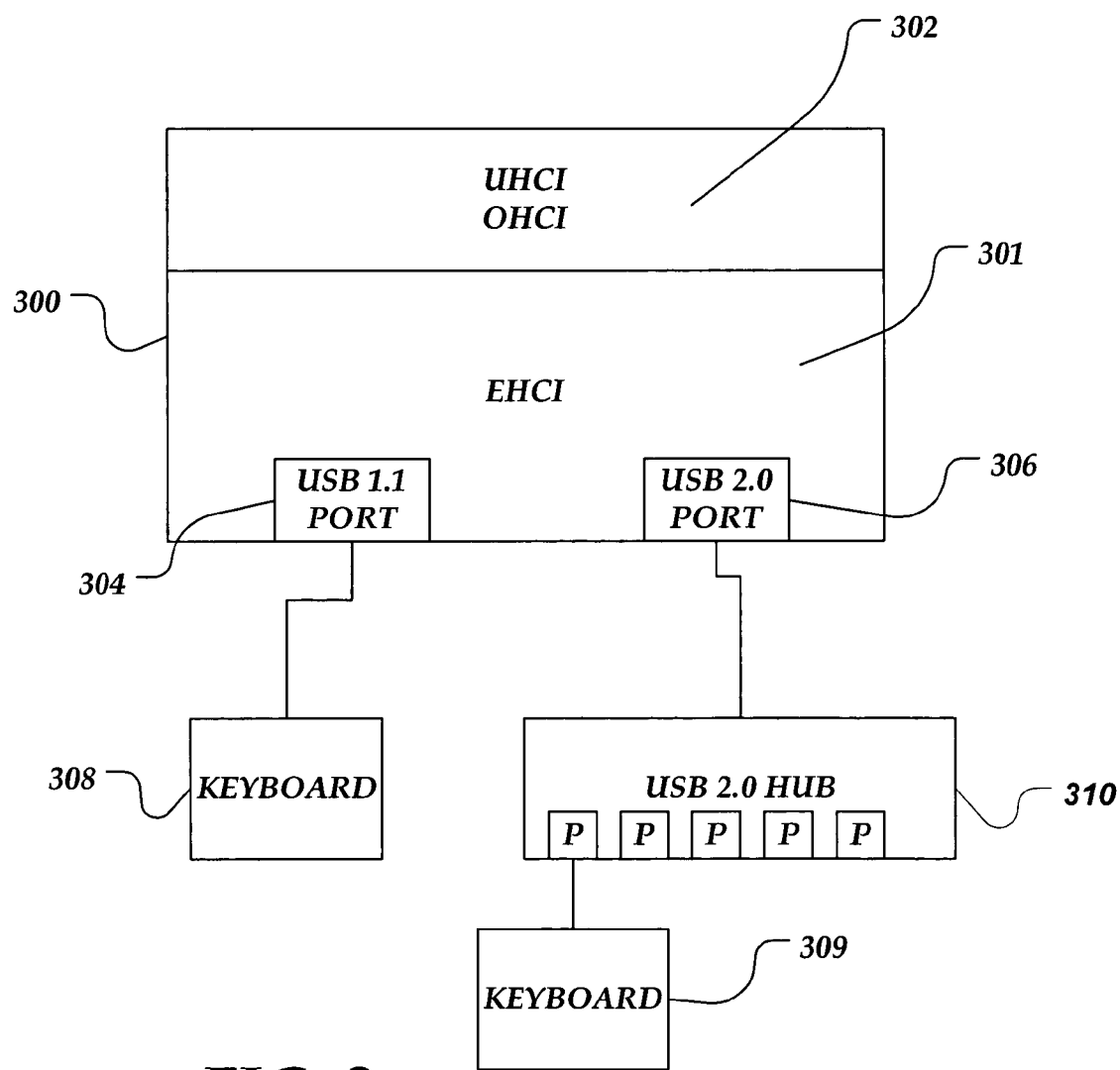
FIG. 3 illustrates a firmware chip in a personal computer implementing the host control driver with an enhanced host control interface and a companion universal host control interface or open host control interface.

FIG. 3 illustrates the EHCI chip 300 with the EHCI firmware 301 and its companion UHCI and OHCI firmware 302 included in the chip. The chip has a USB 1.1 port 304 and a USB 2.0 port 306. A keyboard 308 is attached to the USB 1.1 port. Keyboard 309 can also be attached through a USB 2.0 hub 310 with multiple ports "P" to the USB 2.0 port 306. There can be a slow USB 1.1 keyboard device 308 attached to a slow USB 1.1 port 304. Also there can be a slow keyboard device 309 attached to a port in a high speed USB 2.0 hub 310. The USB 2.0 hub is attached to the high speed USB 2.0 port. The EHCI chip 300 with its EHCI firmware 301 and its companion classic firmware 302, UHCI or OHCI, can deal with handling timing events for the slow keyboard 308, 309 whether it is attached through the USB 1.1 port 304 or the USB 2.0 port 306.

Figure 4:
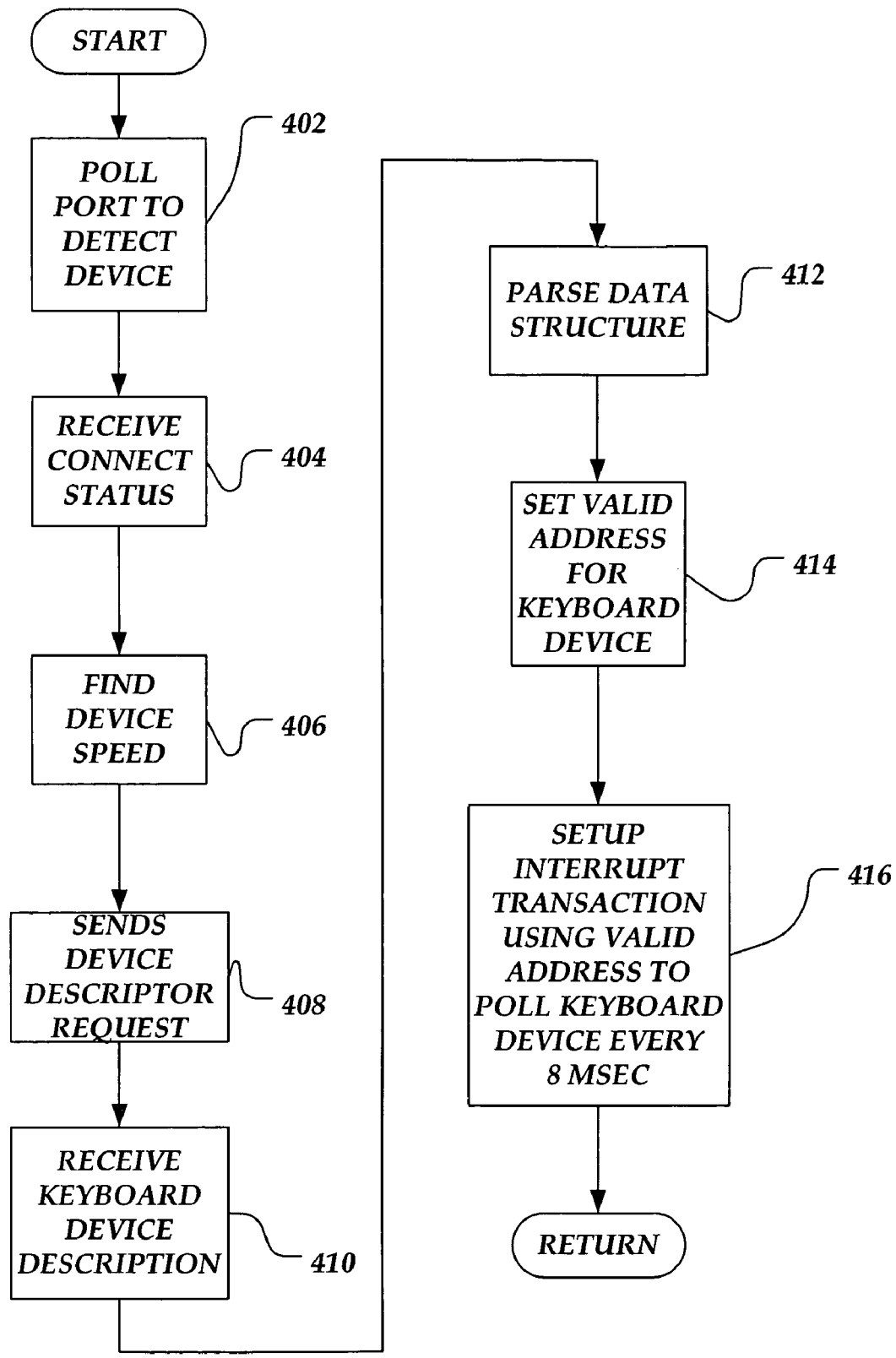
FIG. 4 illustrates the identify USB device module 102 in FIG. 1.

In FIG. 4 the identify USB device module 102 begins with polling operation 402 polling the port to detect the USB device attached to the port. Receive operation 404 receives a connect status indicating the device is connected to the port, and find operation 406 then detects the speed of the device that is attached to the port. When the device speed indicates that a slow USB 1.1 device is attached, the operation flow is handed to the UHCI or OHCI firmware. The UHCI or OHCI firmware with the send operation 408 sends Get Device Descriptor request using "Address 0" to the device at the port. Get Device Descriptor to "Address 0" received at the device will cause the device driver, in this case a keyboard driver, to return a description of the keyboard device. This keyboard device description is received by receive operation 410.

Parse operation 412 parses the data structure of the device description, i.e. the keyboard device description. Set operation 414 then sets a valid address for the keyboard device. In other words an address that is valid for addressing the keyboard device is determined and set. At this point the device attached to the port is found to be a keyboard, the keyboard device description has been received and a valid address has been set for the keyboard device. Since the keyboard is a slow or USB 1.1 type of device, set operation 416 in the UHCI or OHCI interface firmware will set up a scheduled interrupt transaction for use in polling the keyboard driver every 8 milliseconds.

A mechanism for scheduling the interrupt transactions is accomplished by providing a pointer to a memory location containing the interrupt transaction using a valid address for the keyboard. The memory accesses by the host control driver will occur in 1 millisecond intervals. Therefore by providing a transaction with an invalid non-existent device address at a location sequentially separated by eight memory addresses, accesses to the memory may be used as a periodic timer. In effect every eighth access to the memory will fail because of an invalid non-existent device address at the memory address location. This failure can be detected and used to schedule a polling interrupt transaction to a valid address for a USB device driver. In other words when a failed transaction is detected the host control driver points to a predetermined memory address that contains the desired polling interrupt transaction using the valid address for the keyboard driver. By using this program memory access mechanism a timer for scheduling the interrupt transaction is obtained and is independent of any clock timing that is in the computer. After the set up of the scheduled interrupt transaction, the operational flow exits from FIG. 4 and passes to the polling module 104 in FIG. 1.

Figure 5:
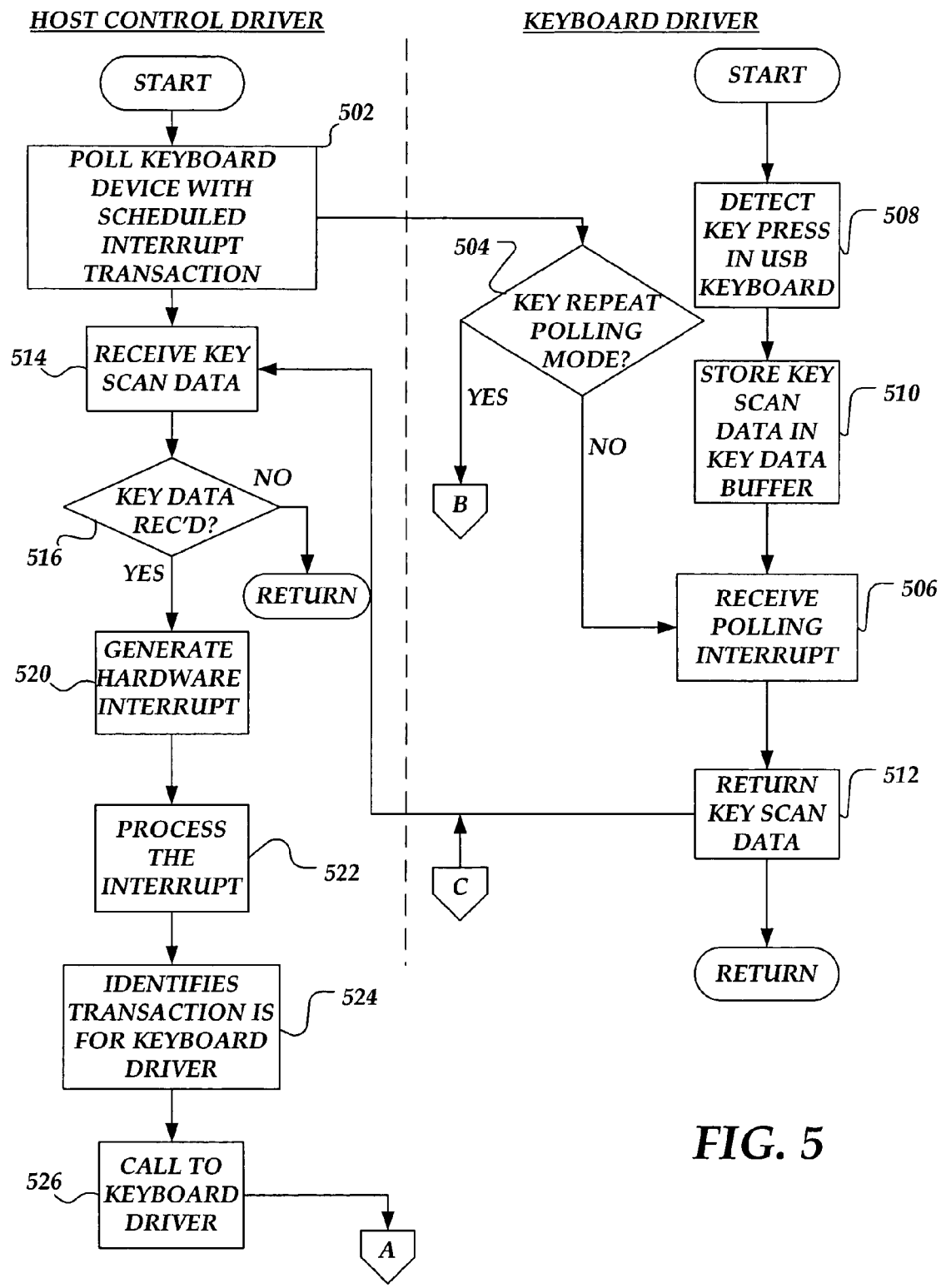
FIG. 5 illustrates the polling module 104 in FIG. 1, and its operational interaction with the key press response module 108 in FIG. 1.

The polling module 104 in FIG. 1 is illustrated in the left hand column of FIG. 5. The right hand column of FIG. 5 illustrates the key press polling response module 108 of FIG. 1. In FIG. 5 a poll keyboard driver operation 502 polls the keyboard device every 8 milliseconds as set up by the host control driver. The poll keyboard operation 502 sends an interrupt transaction to the keyboard device. Key repeat polling mode test operation 504 in the keyboard driver detects whether the keyboard driver is in a key repeat mode. The keyboard driver will only be in the key repeat mode if key repeat polling has been started as a result of an initial detection of the key press. This will be described shortly hereinafter. When a new key is first pressed, the key repeat polling will not have been started for the first polling of the keyboard device. Accordingly the operation flow will branch NO to receive polling interrupt operation 506 at the keyboard driver.

In the keyboard driver, detect key press operation 508 will detect a key press or a key release in the USB 1.1 keyboard. The store key data operation 510 will store the key scan data for the key press in a key data buffer. When receive polling interrupt operation 506 receives the interrupt transaction, the key scan data is retrieved or read from the key data buffer, and return key data operation 512 returns the key scan data back to the host control driver.

At the host control driver the receive key data operation 514 receives the returned key scan data. Key data test operation 516 detects that the key scan data was received and the operation flow passes to generate hardware interrupt operation 520. Generate hardware operation 520 initiates hardware interrupt handling at the interrupt handler which processes the interrupt in process interrupt operation 522. Identify transaction operation 524 identifies that this detected key press interrupt transaction is for the keyboard driver. Call operation 526 then calls the keyboard driver to start the key repeat mode of operation. The key repeat polling response module 110 in FIG. 1 is shown in FIG. 6.

Figure 6:
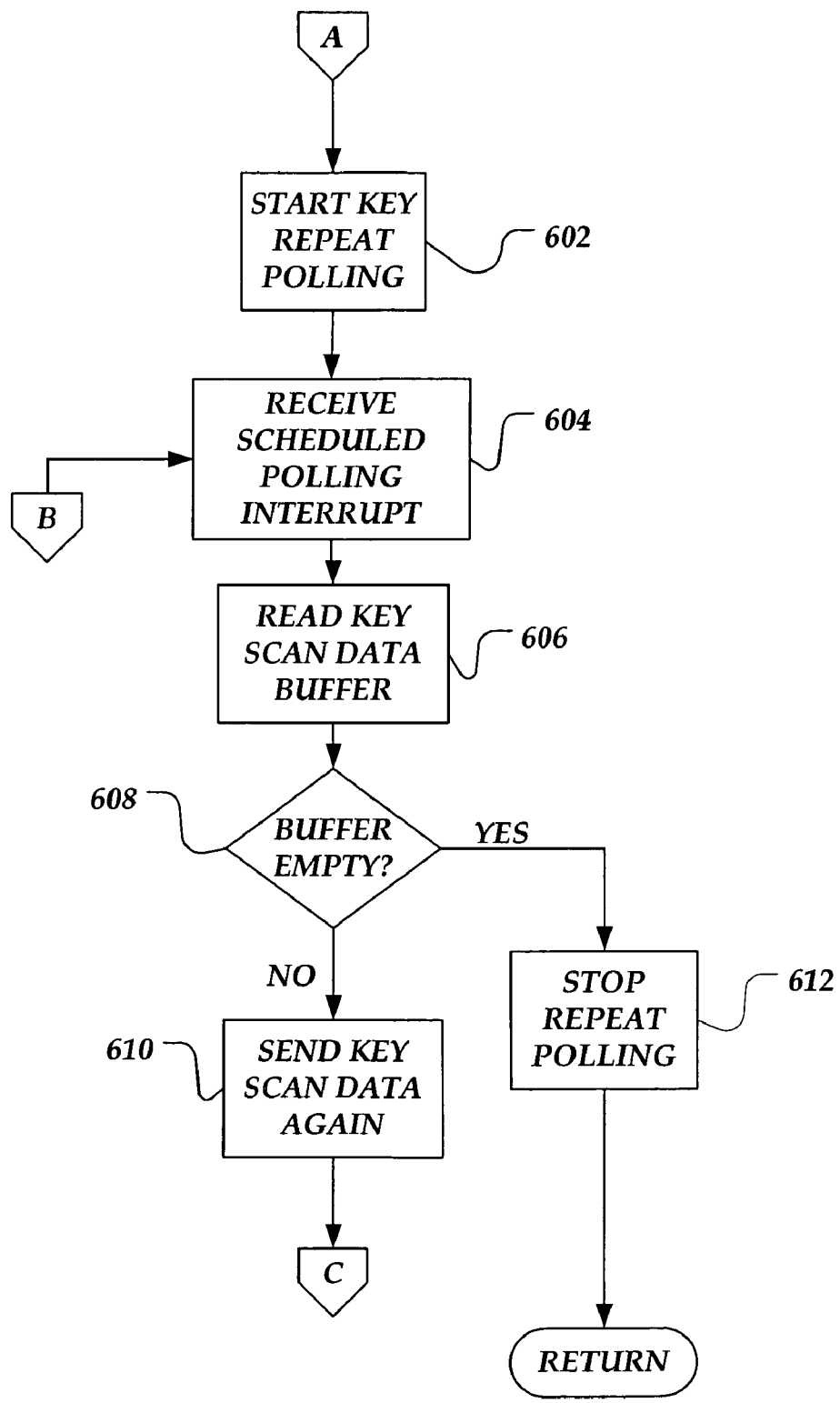
FIG. 6 illustrates the key repeat response module 110 in the keyboard driver as shown in FIG. 1.

In FIG. 6 when a keyboard driver receives the call from the host control driver call operation 526, start operation 602 will start the keyboard key repeat polling mode of operation. Receive operation 604 will then await the next scheduled interrupt transaction from the host control driver. In FIG. 5 the poll keyboard driver operation 502 will initiate this scheduled interrupt transaction. At the key repeat polling started test 504 in FIG. 5 the test will detect that the key repeat mode has been started. The operation flow will then branch YES to receive operation 604 in FIG. 6.

In FIG. 6, receive operation 604 will receive the scheduled polling interrupt transaction, and the operation flow will pass to read key scan data buffer operation 606. The read buffer operation 606 will read the key scan data that is stored in the buffer which will be the key scan data from the initial key press. In other words the operator has pressed a key and is continuing to hold the key pressed. Thus, the key scan data buffer contains the same key scan data that it had when the key was pressed.

Buffer empty test 608 detects whether the key scan data is still in the buffer. If the buffer is not empty, the key data is present and the send key scan data operation 610 will again send the key data to the host control driver where it is received at receive operation 514.

In FIG. 5 the key data test operation 516 will detect that key data was received and the operational flow will branch YES to generate hardware interrupt operation 520. The generate hardware interrupt and process interrupt operations 520 and 522 will process the key scan data received as a result of the interrupt transaction and repeat entry of the key in a display or a file of the computing system. Identify operation 524 and call operation 526 will then return the operation flow back to the keyboard driver in FIG. 6 where the keyboard driver will await reception of the next scheduled polling interrupt at operation 604.

When the next scheduled interrupt transaction is received from poll keyboard operation 502 (FIG. 5), read buffer operation 606 will check the buffer for key scan data. If the key has been released then the key scan data buffer will be empty. The buffer empty test operation 608 will detect the empty buffer, and the operational flow will branch YES to stop repeat polling operation 612. Stop repeat polling operation 612 stops the key repeat polling mode and returns the polling operation to looking for a key press.

At the host control driver the receive key scan data operation 514 (FIG. 5) will not receive key scan data since the buffer was empty, and the operation flow branched to stop polling operation 612. Therefore the key data test operation 516 will branch NO to exit the process of handling key interrupt transactions. In effect the repeat polling process has finished, and the next polling of the keyboard will be looking at the key press response module 108 in FIG. 1. In FIG. 5 this is accomplished by the fact that the next poll keyboard driver operation will cause the operational flow to pass to receive polling interrupt operation 506 in the key press response module as illustrated in FIG. 5. When a new key press occurs then operation 512 will return that key scan data when a scheduled interrupt transaction is received at receive operation 506, and the repeat polling operation mode will be set again.

While the invention has been particularly shown and described with reference to preferred embodiments thereof, it will be understood by those skilled in the art that various other changes in the form and details may be made therein without departing from the spirit and scope of the invention.

What is claimed is:

1. A method for periodically polling a Universal Serial Bus (USB) device driver for a USB 1.1 device connected to a USB 2.0 port of a computing system, the method comprising:

identifying the USB 1.1 device connected to the USB 2.0 port as a USB 1.1 type of USB device;

upon identifying the USB 1.1 device as a USB 1.1 type, setting a scheduled interrupt transaction for polling the USB device driver for the USB 1.1 device utilizing a classic host control interface in a firmware of the computing system installed as a companion to a USB 2.0 enhanced host control interface firmware for controlling the USB 2.0 port, wherein the scheduled interrupt transaction is set by storing a transaction with an invalid, non-existent device address at memory locations sequentially separated by a pre-determined number of memory locations accessed by the classic host control interface, and providing a transaction using a valid address of the USB 1.1 device for access by the classic host control interface upon failure of the transaction with the invalid, non-existent device address;

first responding to the interrupt transaction to return a first response from the USB device driver, the first response indicating data from the USB 1.1 device, and setting the USB device driver into a repeat mode;

detecting that the USB device driver is in the repeat mode; and in response to detecting that the USB device driver is in the repeat mode, second responding to the interrupt transactions to return a same response as the first response.

2. The method of claim 1 wherein the act of first responding further comprises:

detecting the data from the USB 1.1 device; and storing the data in a buffer.

3. The method of claim 2 wherein the act of second responding comprises:

starting repeat mode;

reading the data in the buffer;
detecting whether the buffer is empty;
if the buffer is not empty, sending the data in response to each scheduled interrupt transaction; and
if the buffer is empty, stopping the repeat mode.

4. The method of claim 3 wherein the USB 1.1 device is a keyboard device, the USB device driver is a keyboard driver, the data is key press data and the repeat mode is key repeat mode.

5. A computer storage medium having computer executable instructions stored thereon which, when executed by a computer, cause the computer to:
identify a USB keyboard connected to a USB 2.0 port of the computer as a low-speed USB device;
setup scheduled interrupt transactions for a USB keyboard driver using a classic host control interface in a BIOS of the computer installed as a companion to a USB 2.0 enhanced host control interface firmware for controlling the USB 2.0 port, wherein the scheduled interrupt transactions are setup by storing a transaction with an invalid, non-existent device address at memory locations sequentially separated by a pre-determined number of memory locations accessed by the classic host control interface and providing a transaction using a valid address of the USB keyboard for access by the classic host control interface upon failure of the transaction with the invalid, non-existent device address;
periodically poll the USB keyboard driver with the scheduled interrupt transactions for data from the USB keyboard;
receive into a data buffer key scan data from a key press of the USB keyboard;
respond to a first interrupt transaction by returning a first response from the USB keyboard driver, the first response indicating the key scan data from the data buffer;
set the USB keyboard driver into a repeat mode;
respond to a second interrupt transaction by detecting USB keyboard driver is in the repeat mode;
in response to detecting that the USB keyboard driver is in the repeat mode, determine whether the data buffer is empty;
in response to determining that the data buffer is not empty, return a second response from the USB keyboard driver, the second response being the same as the first response; and
in response to determining that the data buffer is empty, stop the repeat mode of the USB keyboard driver.

6. A system for periodically polling a device driver for a USB 1.1 device connected to a USB 2.0 port of a computing system, the system comprising:
a processor;
a firmware operative connected to the processor;
an enhanced host control interface contained in the firmware for controlling the USB 2.0 port; and
a classic host control interface installed as a companion to the enhanced host control interface in the firmware, wherein the enhanced host control interface and classic host control interface are configured to cause the processor to
identify the USB 1.1 device connected to the USB 2.0 port as a USB 1.1 type, and
upon identifying the USB 1.1 device as the USB 1.1 type, schedule an interrupt transaction for polling the device driver for the USB 1.1 device through the classic host control interface by storing a transaction with an invalid, non-existent device address at memory locations sequentially separated by a pre-determined number of memory locations accessed by the classic host control interface, and providing a transaction using a valid address of the USB 1.1 device for access by the classic host control interface upon failure of the transaction with the invalid, non-existent device address.

7. The system of claim 6, wherein the pre-determined number of memory locations is determined from the interval of accesses by the classic host control interface.

8. The system of claim 7, wherein the interval of accesses by the classic host control interface is one millisecond, and wherein the pre-determined number of memory locations is seven.

9. The system of claim 6, wherein the USB 1.1 device is a keyboard device and the device driver is a keyboard driver.

* * * * *